(12) United States Patent
Isowaki et al.

(10) Patent No.: US 11,600,297 B1
(45) Date of Patent: Mar. 7, 2023

(54) MAGNETIC REPRODUCING AND PROCESSING DEVICE, MAGNETIC RECORDING AND REPRODUCING DEVICE, AND MAGNETIC REPRODUCING METHOD

(71) Applicant: KABUSHIKI KAISHA TOSHIBA, Tokyo (JP)

(72) Inventors: Yousuke Isowaki, Yokohama (JP); Katsuya Sugawara, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/649,567

(22) Filed: Feb. 1, 2022

(30) Foreign Application Priority Data

Aug. 27, 2021 (JP) .............................. JP2021-139033

(51) Int. Cl.
*G11B 20/12* (2006.01)
*G11B 5/035* (2006.01)
*G11B 20/18* (2006.01)
*G11B 5/012* (2006.01)

(52) U.S. Cl.
CPC .......... *G11B 20/1833* (2013.01); *G11B 5/012* (2013.01); *G11B 2020/185* (2013.01)

(58) Field of Classification Search
CPC .................. G11B 5/486; G11B 5/3912; G11B 20/10009; G11B 5/3964; G11B 5/012; G11B 27/36; G11B 2220/20; G11B 5/5967; G11B 5/5534; G11B 21/106; G11B 5/00; G11B 5/09; G11B 5/035; G11B 20/12

USPC ................. 360/25, 31, 55, 65, 75, 77.05, 48
See application file for complete search history.

(56) References Cited

U.S. PATENT DOCUMENTS

| | | | |
|---|---|---|---|
| 9,105,277 B1 * | 8/2015 | Harada | G11B 5/012 |
| 9,431,052 B2 * | 8/2016 | Oberg | G11B 5/3964 |
| 9,728,221 B2 | 8/2017 | Oberg et al. | |
| 9,837,115 B1 | 12/2017 | Sridhara et al. | |
| 2017/0243604 A1 * | 8/2017 | Sugawara | G11B 5/3954 |
| 2020/0389188 A1 | 12/2020 | Belzer et al. | |

* cited by examiner

*Primary Examiner* — Nabil Z Hindi
(74) *Attorney, Agent, or Firm* — Oblon, McClelland, Maier & Neustadt, L.L.P.

(57) ABSTRACT

According to one embodiment, a magnetic reproducing and processing device includes an acquirer and a processor. The acquirer is configured to acquire a first electric signal obtained by reproducing information recorded in a first recording area of a magnetic recording medium by a first reproducing element and a second electric signal obtained by reproducing the information recorded in the first recording area by a second reproducing element. A first sensitivity of the first reproducing element to a magnetic signal recorded on the magnetic recording medium is different from a second sensitivity of the second reproducing element to the magnetic signal. The processor is configured to output a reproduced signal corresponding to the information recorded in the first recording area based on the first electric signal and the second electric signal acquired by the acquirer.

18 Claims, 11 Drawing Sheets

MAGNETIC REPRODUCING AND PROCESSING DEVICE, MAGNETIC RECORDING AND REPRODUCING DEVICE, AND MAGNETIC REPRODUCING METHOD

CROSS-REFERENCE TO RELATED APPLICATIONS

This application is based upon and claims the benefit of priority from Japanese Patent Application No. 2021-139033, filed on Aug. 27, 2021; the entire contents of which are incorporated herein by reference.

FIELD

Embodiments described herein relate generally to a magnetic reproducing and processing device, magnetic recording and reproducing device, and a magnetic reproducing method.

BACKGROUND

Information is recorded on a magnetic recording medium such as an HDD (Hard Disk Drive) using a magnetic head. It is desired to improve the recording reproduction density in the magnetic recording and reproducing device.

DETAILED DESCRIPTION

Figure 1:
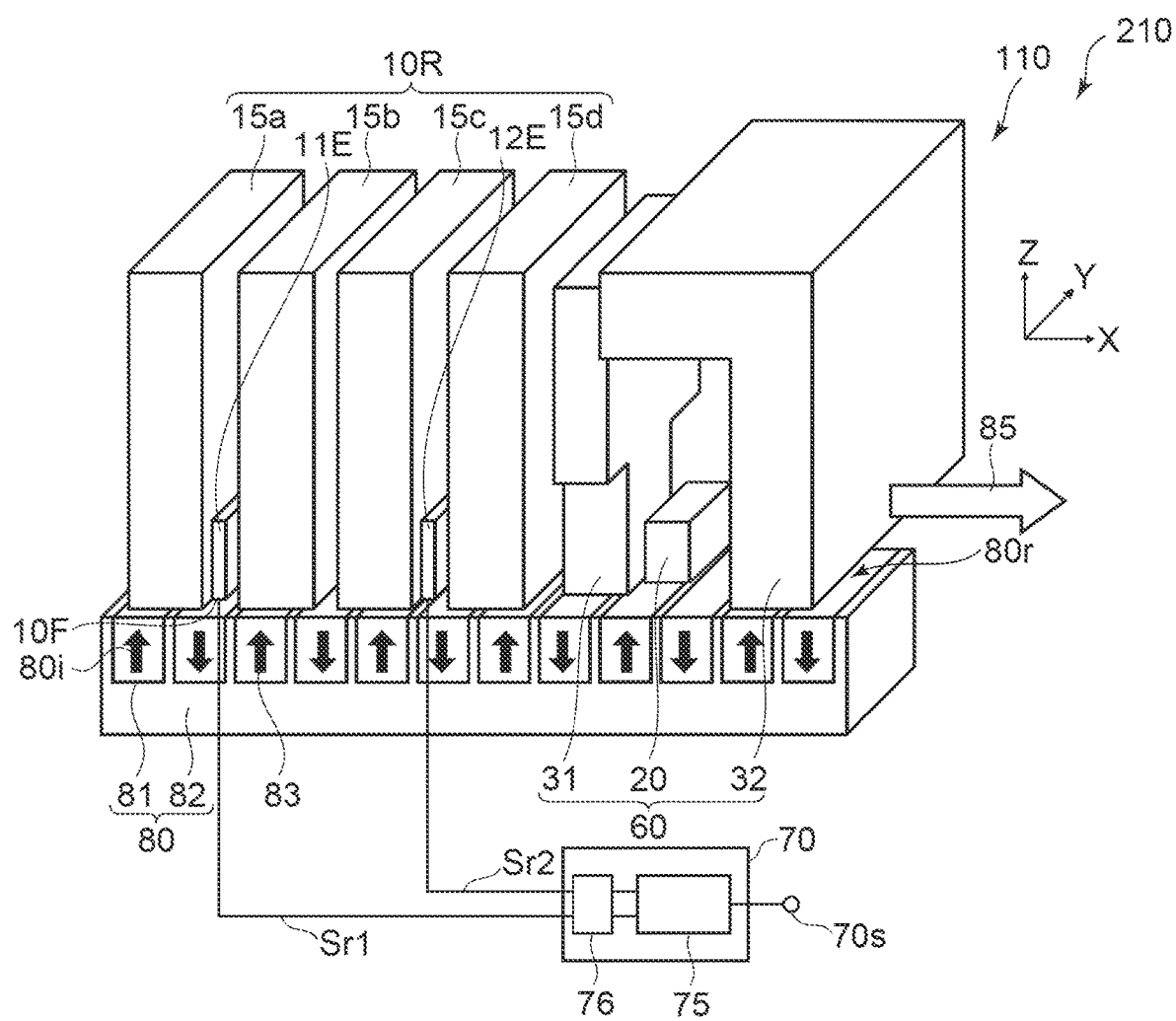
FIG. 1 is a schematic view illustrating a magnetic reproducing and processing device according to a first embodiment.

According to one embodiment, a magnetic reproducing and processing device includes an acquirer and a processor. The acquirer is configured to acquire a first electric signal obtained by reproducing information recorded in a first recording area of a magnetic recording medium by a first reproducing element and a second electric signal obtained by reproducing the information recorded in the first recording area by a second reproducing element. A first sensitivity of the first reproducing element to a magnetic signal recorded on the magnetic recording medium is different from a second sensitivity of the second reproducing element to the magnetic signal. The processor is configured to output a reproduced signal corresponding to the information recorded in the first recording area based on the first electric signal and the second electric signal acquired by the acquirer.

According to one embodiment, a magnetic recording and reproducing device includes the magnetic reproducing and processing device described above, and a magnetic head including a reproducing part including the first reproducing element and the second reproducing element.

According to one embodiment, a magnetic reproducing method can include acquiring a first electric signal obtained by reproducing information recorded in a first recording area of a magnetic recording medium by a first reproducing element and a second electric signal obtained by reproducing the information recorded in the first recording area by a second reproducing element. A first sensitivity of the first reproducing element to a magnetic signal recorded on the magnetic recording medium is different from a second sensitivity of the second reproducing element to the magnetic signal. The method can include outputting a reproduced signal corresponding to the information recorded in the first recording area based on the acquired first electric signal and the acquired second electric signal.

First Embodiment

A magnetic reproducing and processing device 70 according to the embodiment is used together with a magnetic head 110. The magnetic head 110 includes a reproducing part 10R. A magnetic recording and reproducing device 210 according to the embodiment includes the reproducing part 10R (magnetic head 110) and the magnetic reproducing and processing device 70.

The reproducing part 10R of the magnetic head 110 reproduces information 80i recorded on a magnetic recording medium 80. As will be described later, the magnetic recording medium 80 has a disk shape. The magnetic recording medium 80 includes a recording area (for example, a first recording area 80r). The recording area may be spiral around the center of the magnetic recording medium.

The magnetic recording medium 80 includes, for example, a medium substrate 82 and a magnetic recording layer 81 provided on the medium substrate 82. Magnetization 83 of the magnetic recording layer 81 (orientation of the magnetization 83) corresponds to the information 80i.

The magnetic head 110 may include the recording part 60. The magnetization 83 is controlled by the recording part 60. The recording part 60 includes, for example, a first magnetic pole 31. The recording magnetic field generated from the first magnetic pole 31 is applied to the magnetic recording medium 80. Thereby, the magnetization 83 is controlled. In this example, the recording part 60 includes a second magnetic pole 32 and a magnetic element 20. The magnetic element 20 is provided between a part of the first magnetic pole 31 and a part of the second magnetic pole 32. The first magnetic pole 31 and the second magnetic pole 32 can form a magnetic circuit. The magnetic element 20 includes a magnetic film. In one example, the magnetic element 20 can control, for example, the orientation of the recording magnetic field generated from the first magnetic pole 31. In another example, the magnetic element 20 can generate an alternating magnetic field. The alternating magnetic field is applied to the magnetic recording medium 80. For example, MAMR (Microwave Assisted Magnetic Recording) may be performed.

The reproducing part 10R includes a first reproducing element 11E and a second reproducing element 12E. For example, the first reproducing element 11E is provided between a first reproducing shield 15a and a second reproducing shield 15b. For example, the second reproducing element 12E is provided between a third reproducing shield 15c and a fourth reproducing shield 15d. In this example, the second reproducing shield 15b is provided between the first reproducing shield 15a and the fourth reproducing shield 15d. The third reproducing shield 15c is provided between the second reproducing shield 15b and the fourth reproducing shield 15d.

A first direction from the first reproducing 11E to the second reproducing 12E is defined as an X-axis direction. One direction perpendicular to the X-axis direction is defined as a Z-axis direction. A direction perpendicular to the X-axis direction and the Z-axis direction is defined as a Y-axis direction.

The Z-axis direction corresponds to, for example, a height direction. The X-axis direction corresponds to, for example, a down-track direction. The Y-axis direction corresponds to, for example, a cross-track direction. The magnetic recording medium 80 and the magnetic head 110 move relatively along a medium moving direction 85 along the down-track direction. The information 80i can be recorded on the magnetic recording medium 80 at a desired position on the magnetic recording medium 80. The information 80i recorded on the magnetic recording medium 80 can be reproduced at a desired position on the magnetic recording medium 80.

The magnetic head 110 has a medium-facing surface 10F. The medium-facing surface 10F faces the magnetic recording medium 80. The medium-facing surface 10F may be considered to be included in at least one of the first reproducing element 11E or the second reproducing element 12E. The medium-facing surface 10F corresponds to, for example, ABS (Air Bearing Surface). The medium-facing surface 10F is, for example, along the X-Y plane.

The first reproducing element 11E can reproduce the information 80i recorded in the first recording area 80r of the magnetic recording medium 80 and output the first electric signal Sr1. The second reproducing element 12E can reproduce the information 80i recorded in the first recording area 80r of the magnetic recording medium 80 and output the second electric signal Sr2.

The magnetic reproducing and processing device 70 includes an acquirer 76 and a processor 75. The acquirer 76 can acquire the first electric signal Sr1 obtained by reproducing the information 80i recorded in the first recording area 80r of the magnetic recording medium 80 by the first reproducing element 11E and the second electric signal Sr2 obtained by reproducing the information 80i recorded in the first magnetic recording area 80r by the second reproducing element 12E. The acquirer 76 is, for example, an input circuit. The acquirer 76 may be, for example, an input interface.

As will be described later, first sensitivity of the first reproducing element 11E to a magnetic signal (magnetic signal strength) recorded on the magnetic recording medium 80 is different from second sensitivity of the second reproducing element 12E to the magnetic signal (magnetic signal strength).

The processor 75 can output a reproduced signal 70s based on the first electric signal Sr1 and the second electric signal Sr2 acquired by the acquirer 76. The reproduced signal 70s is a signal (reproduced information) corresponding to the information 80i recorded in the first recording area 80r.

In the embodiment, the reproduced signal 70s is derived and output based on the electric signals obtained from multiple reproducing elements having different sensitivities. This enables higher-precision reproduction. Magnetic recording and reproducing with a higher line recording density is possible. According to the embodiment, a magnetic reproducing and processing device can be provided, in which the recording and reproducing density is possible to be improved.

Figure 2A:
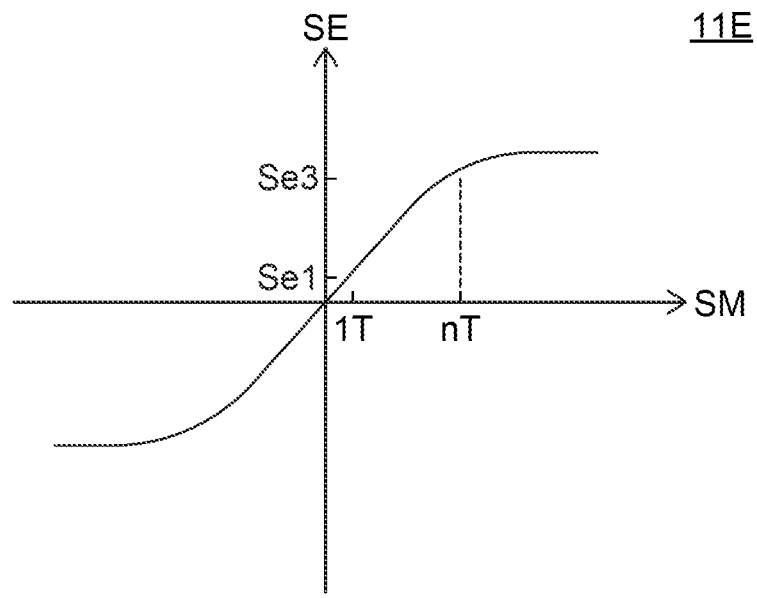
FIGS. 2A and 2B are graphs illustrating relating to characteristics of the magnetic reproducing and processing device according to the first embodiment.
Figure 2B:
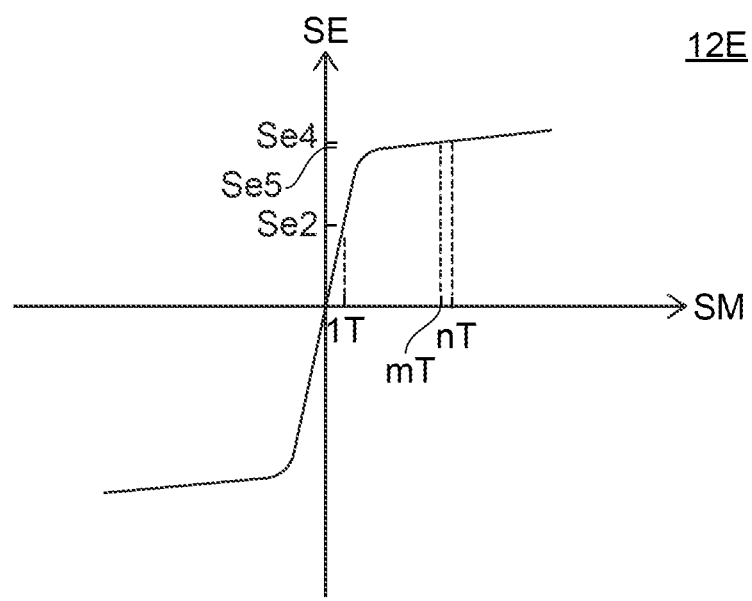

FIGS. 2A and 2B are graphs illustrating characteristics relating to the magnetic reproducing and processing device according to the first embodiment.

FIG. 2A corresponds to the first reproducing element 11E. FIG. 2B corresponds to the second reproducing element 12E. The horizontal axis of these figures corresponds to the magnetic signal strength SM in the first recording area 80r of the magnetic recording medium 80. The vertical axis of these figures corresponds to the electric signal strength SE obtained by the magnetic reproducing element. In FIG. 2A, the electric signal strength SE corresponds to the strength of the first electric signal Sr1. In FIG. 2B, the electric signal strength SE corresponds to the strength of the second electric signal Sr2.

As shown in FIG. 2A, when the magnetic signal strength SM changes, the electric signal strength SE changes. In the example of FIG. 2A, in the electric signal (first electric signal Sr1) obtained from the first reproducing element 11E, when the magnetic signal strength SM changes within a certain range, the electric signal strength SE changes substantially linearly.

For example, the magnetic signal strength SM includes a 1T pattern strength. The 1T pattern strength corresponds to the minimum recording pattern. The magnetic signal strength SM includes an nT pattern strength. The nT pattern strength corresponds to n times the minimum recording pattern. "n" is an integer not less than 3. In one example, n is 12. In this case, the nT pattern strength corresponds to the 12T pattern strength.

In the example shown in FIG. 2A, when the magnetic signal strength SM changes within the range between the 1T pattern strength and the nT pattern strength, the electric signal strength SE (strength of the first electric signal Sr1) changes substantially linearly.

As shown in FIG. 2B, the characteristic of the electric signal strength SE (strength of the second electric signal Sr2) obtained from the second reproducing element 12E is different from characteristics the electric signal strength SE (strength of the first electrical signal Sr1) obtained from the first reproducing element 11E. In this example, in at least a part of the range of the magnetic signal strength SM, the rate of change (sensitivity or inclination) of the electric signal strength SE with respect to the change of the magnetic signal strength SM is different between the first reproducing element 11E and the second reproducing element 12E.

For example, as shown in FIG. 2A, in the first reproducing element 11E, the electric signal strength SE (first electric signal Sr1) includes a first pattern signal Se1 corresponding to the 1T pattern strength. As shown in FIG. 2B, in the second reproducing element 12E, the electric signal strength SE (second electric signal Sr2) includes a second pattern signal Se2 corresponding to the 1T pattern strength. The strength of the second pattern signal Se2 is greater than the strength of the first pattern signal Se1. In this way, the sensitivities of the multiple reproducing elements are different from each other.

As will be described later, the strength of the second pattern signal Se2 is preferably not less than 1.1 times the strength of the first pattern signal Set.

The electric signal strength SE (first electric signal Sr1) of the first reproducing element 11E includes a third pattern signal Se3 corresponding to the nT pattern strength. The electric signal strength SE (second electric signal Sr2) of the second reproducing element 12E includes a fourth pattern signal Se4 corresponding to the nT pattern strength. The strength of the fourth pattern signal Se4 is close to the strength of the third pattern signal Se3. The absolute value of the difference between the strength of the first pattern signal Se1 and the strength of the second pattern signal Se2 is greater than the absolute value of the difference between the strength of the third pattern signal Se3 and the strength of the fourth pattern signal Se4.

For example, between the 1T pattern strength and the nT pattern strength, the first reproducing element 11E has a linear reproduction characteristic. For example, between the 1T pattern strength and the nT pattern strength, the second reproducing element 12E has a non-linear reproduction characteristic.

For example, between the first pattern signal Set and the third pattern signal Se3, the electric signal strength SE (strength of the first electric signal Sr1) of the first reproducing element 11E changes substantially linearly with respect to the magnetic signal strength SM. For example, between the second pattern signal Se2 and the fourth pattern signal Se4, the electric signal strength SE (strength of the second electric signal Sr2) of the second reproducing element 12E changes non-linearly with respect to the magnetic signal strength SM.

For example, as shown in FIG. 2B, the magnetic signal strength SM includes an mT pattern strength corresponding to m times (m is n−1) of the minimum recording pattern. The electric signal strength SE (second electric signal Sr2) of the second reproducing element 12E includes a fifth pattern signal Se5 corresponding to the mT pattern strength. In the region including the fifth pattern signal Se5 and the fourth pattern signal Se4, the electric signal strength SE is substantially saturated. The absolute value of the difference between the strength of the fifth pattern signal Se5 and the strength of the fourth pattern signal Se4 is less than the difference in other parts.

For example, the absolute value (second absolute value) of the difference between the strength of the fifth pattern signal Se5 and the strength of the fourth pattern signal Se4 is less than 1/m of the absolute value (first absolute value) of the difference between the strength of the second pattern signal Se2 and the strength of the fourth pattern signal Se4. For example, the second absolute value may be not more than 0.8 times of 1/m of the first absolute value. The second absolute value may be not more than 0.5 times of 1/m of the first absolute value.

In this way, multiple electric signals obtained from the multiple reproducing elements having different sensitivities are supplied to the magnetic reproducing and processing device 70. Hereinafter, an example of the magnetic reproducing and processing device 70 will be described.

Figure 3:
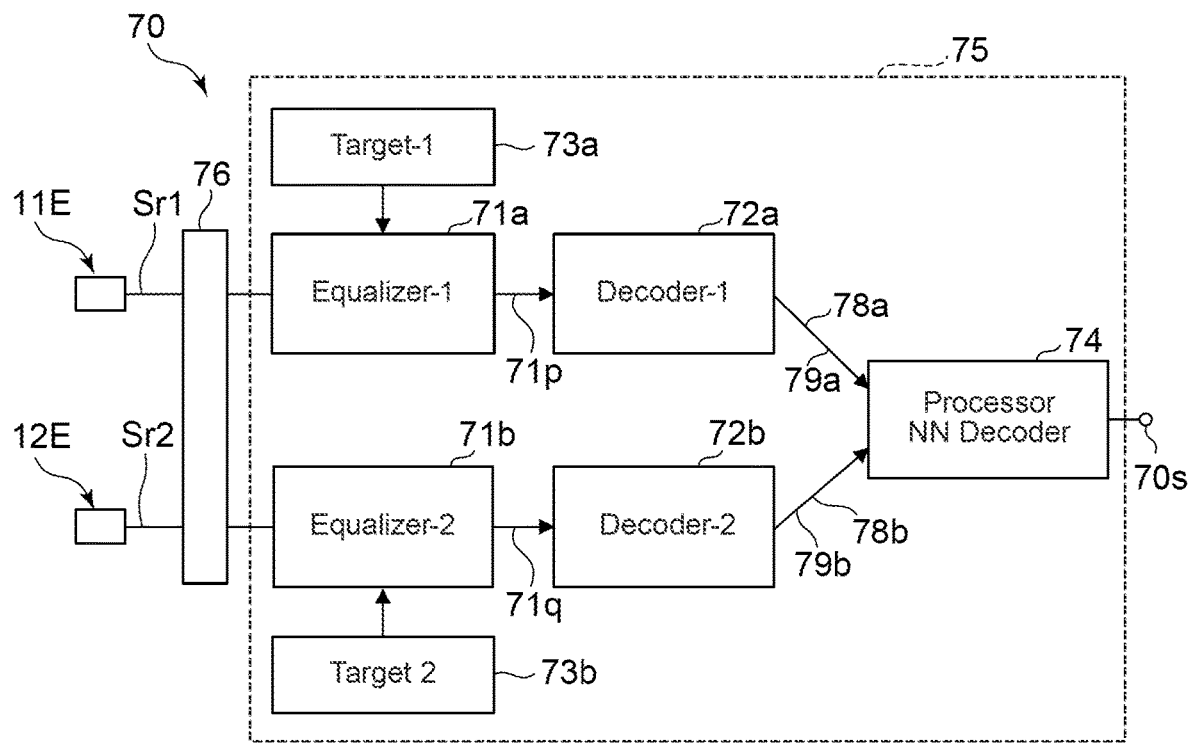
FIG. 3 is a schematic view illustrating the magnetic reproducing and processing device according to the first embodiment.

FIG. 3 is a schematic view illustrating the magnetic reproducing and processing device according to the first embodiment.

As shown in FIG. 3, the acquirer 76 of the magnetic reproducing and processing device 70 acquires the first electric signal Sr1 obtained from the first reproducing element 11E and the second electric signal Sr2 obtained from the second reproducing element 12E.

The processor 75 includes a first waveform equalizer 71a, a second waveform equalizer 71b, a first signal processor 72a, a second signal processor 72b, and a processing circuit 74.

The first electric signal Sr1 acquired by the acquirer 76 is supplied to the first waveform equalizer 71a. The first waveform equalizer 71a waveform-processes the first electric signal Sr1 acquired by the acquirer 76. For example, the first target part 73a supplies the first target data regarding the first reproducing element 11E to the first waveform equalizer 71a. In the first waveform equalizer 71a, waveform processing is performed based on the first target data.

The second electric signal Sr2 acquired by the acquirer 76 is supplied to the second waveform equalizer 71b. The second waveform equalizer 71b waveform-processes the second electric signal Sr2 acquired by the acquirer 76. For example, the second target part 73b supplies the second target data regarding the second reproducing element 12E to the second waveform equalizer 71b. In the second waveform equalizer 71b, waveform processing is performed based on the second target data.

A signal 71p waveform-processed in the first waveform equalizer 71a is supplied to the first signal processor 72a. The first signal processor 72a is, for example, a first decoder. The first signal processor 72a processes the signal 71p from the first waveform equalizer 71a. A first output signal 78a (output information) is output from the first signal processor 72a.

A signal 71q waveform-processed in the second waveform equalizer 71b is supplied to the second signal processor 72b. The second signal processor 72b is, for example, a second decoder. The second signal processor 72b processes the signal 71q from the second waveform equalizer 71b. A second output signal 78b (output information) is output from the second signal processor 72b.

The processing circuit 74 can derive the reproduced signal 70s based on the first output signal 78a of the first signal processor 72a and the second output signal 78b of the second signal processor 72b.

For example, the first output signal 78a may include a first likelihood 79a with respect to the signal 71p from the first waveform equalizer 71a. The second output signal 78b may include a second likelihood 79b with respect to the signal 71q from the second waveform equalizer 71b. The processing circuit 74 can derive the reproduced signal 70s based on the first likelihood 79a and the second likelihood 79b.

For example, the processing circuit 74 may include a neural network (NN) processor that the first output signal 78a and the second output signal 78b are input. The processing circuit 74 may include a machine learning circuit that the first output signal 78a and the second output signal 78b are input.

In one example, the magnetic reproducing and processing device 70 may select one of the first output signal 78a corresponding to the first electric signal Sr1 obtained from the first reproducing element 11E and the second output signal 78b corresponding to the second electric signal Sr2 obtained from the second reproducing element 12E. The magnetic reproducing and processing device 70 may output a signal (information) corresponding to the selected output signal as the reproduced signal 70s.

In the embodiment, at least one of the first waveform equalizer 71a or the second waveform equalizer 71b may include, for example, a PR (Partial-Response) circuit.

In the embodiment, at least one of the first signal processor 72a or the second signal processor 72b may include, for example, a PRML (Partial-Response Maximum-Likelihood) circuit.

In the embodiment, at least one of the first signal processor 72a or the second signal processor 72b may include an LDPC (Low Density Parity Check) decoder.

Figure 4:
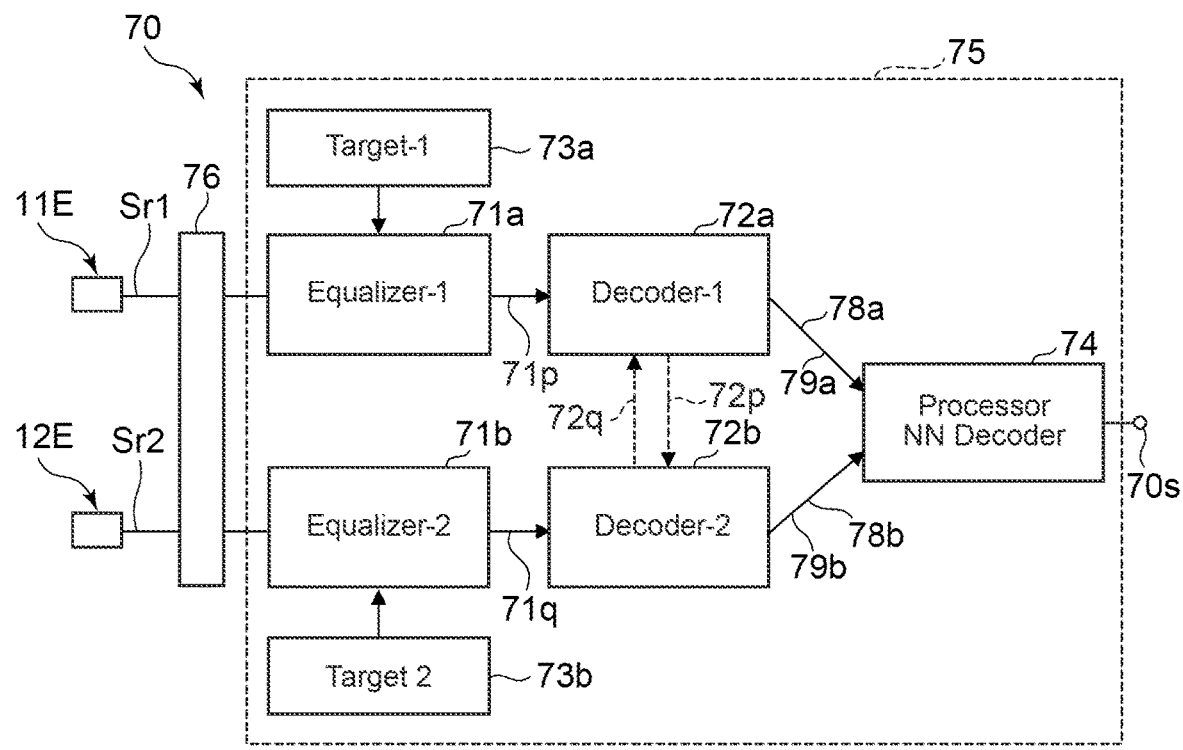
FIG. 4 is a schematic view illustrating the magnetic reproducing and processing device according to the first embodiment.

FIG. 4 is a schematic view illustrating the magnetic reproducing and processing device according to the first embodiment.

As shown in FIG. 4, in the processor 75 of the magnetic reproducing and processing device 70, at least a part of a processing result 72p of the first signal processor 72a may be supplied to the second signal processor 72b. The processing result 72p of the first signal processor 72a includes, for example, at least a part of the first output signal 78a. The second signal processor 72b may be able to process the signal 71q of the second waveform equalizer 71b by using the at least a part of the processing result 72p of the first signal processor 72a.

At least a part of the processing result 72q of the second signal processor 72b may be supplied to the first signal processor 72a. The processing result 72q of the second signal processor 72b includes, for example, at least a part of the second output signal 78b. The first signal processor 72a may be able to process the signal 71p of the first waveform equalizer 71a by using at least a part of the processing result 72q of the second signal processor 72b.

Figure 5:
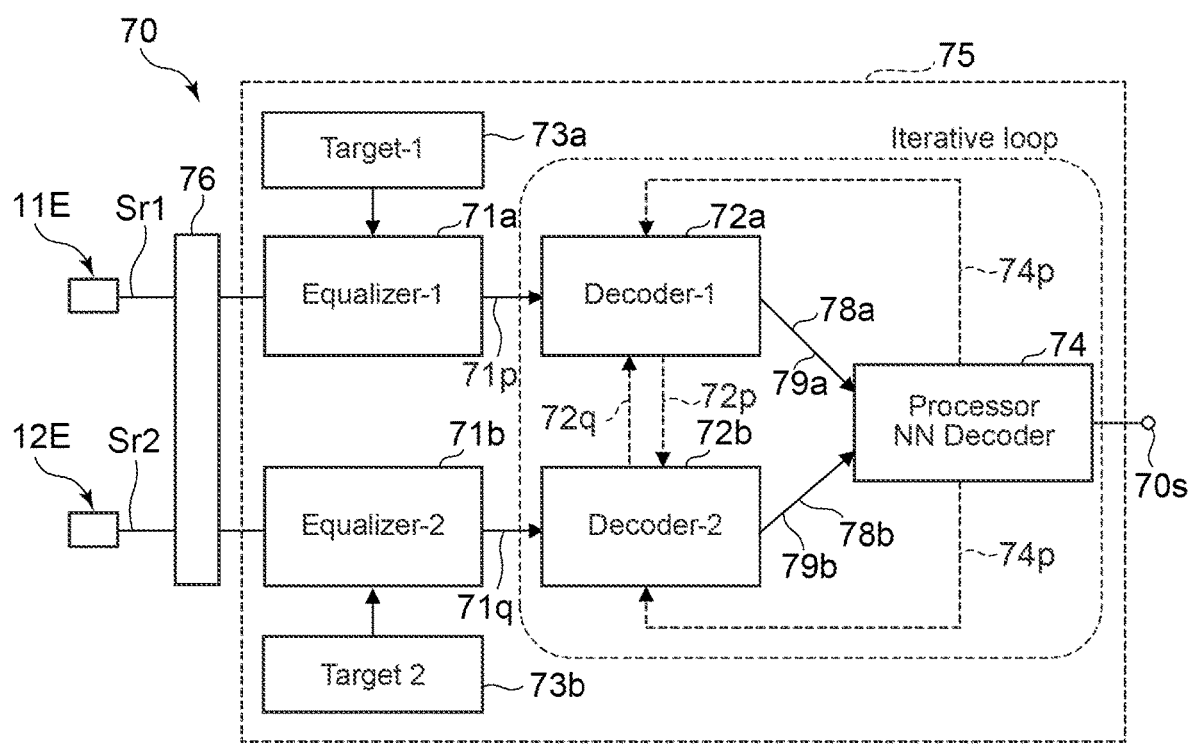
FIG. 5 is a schematic view illustrating the magnetic reproducing and processing device according to the first embodiment.

FIG. 5 is a schematic view illustrating the magnetic reproducing and processing device according to the first embodiment.

As shown in FIG. 5, in the processor 75 of the magnetic reproducing and processing device 70, at least a part of the processing result 74p of the processing circuit 74 may be input to the first signal processor 72a and the second signal processor 72b. The operation of the first signal processor 72a, the operation of the second signal processor 72b, and the operation of the processing circuit 74 may be repeatedly performed. For example, iterative loop processing may be performed.

Figure 6:
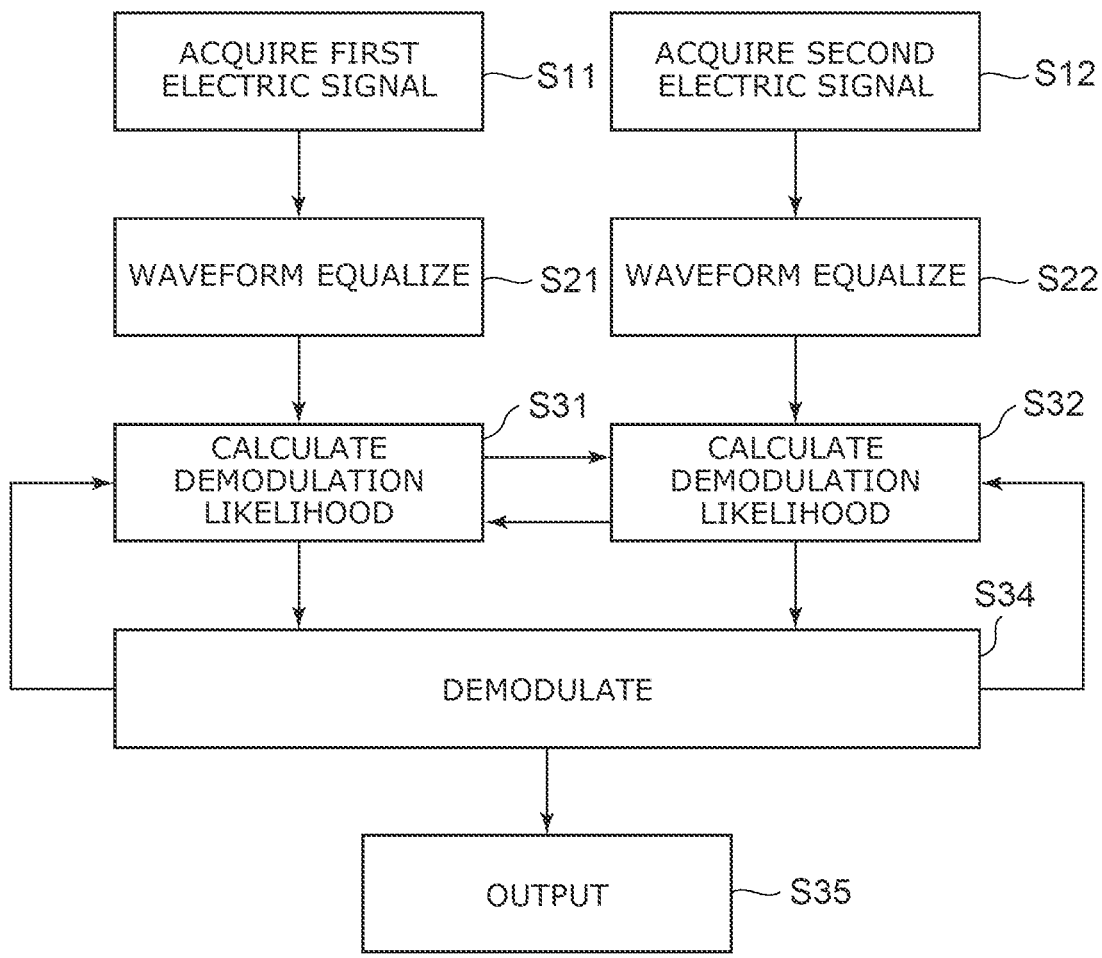
FIG. 6 is a flowchart illustrating the operation of the magnetic reproducing and processing device according to the first embodiment.

FIG. 6 is a flowchart illustrating the operation of the magnetic reproducing and processing device according to the first embodiment.

FIG. 6 illustrates the operation of the magnetic reproducing and processing device 70. As shown in FIG. 6, the magnetic reproducing and processing device 70 acquires the first electric signal Sr1 and the second electric signal Sr2 (steps S11 and S12). The magnetic reproducing and processing device 70 performs waveform processing (waveform equalization processing) on the first electric signal Sr1 and waveform processing (waveform equalization processing) on the second electric signal Sr2 (steps S21 and S22).

The magnetic reproducing and processing device 70 demodulates the first electric signal Sr1 (step S31) and demodulates the second electric signal Sr2 (step S32) based on the result of the waveform equalization processing. In the demodulation, the likelihoods (first likelihood 79a and second likelihood 79b) may be derived. At least a part of the result of step S31 may be utilized in step S32. At least a part of the result of step S32 may be utilized in step S31.

The magnetic reproducing and processing device 70 performs demodulation (step S34) based on the demodulation result and the likelihood (first likelihood 79a and second likelihood 79b). Step S34 and step S31 may be repeated. Step S34 and step S32 may be repeated.

The magnetic reproducing and processing device 70 outputs (step S35) a reproduced signal 70s corresponding to the result of demodulation (step S34).

In the embodiment, the reproduced signal 70s is derived and output based on the electric signals obtained from multiple reproducing elements having different sensitivities. As a result, errors can be further suppressed. Higher precision reproduction is possible. For example, it is possible to perform reproduction with higher accuracy than in the case of reproduction based on electric signals obtained from multiple reproducing elements having the same sensitivity. Magnetic recording and reproducing with a higher line recording density is possible. A magnetic reproducing and processing device can be provided, in which the recording and reproducing density is possible to be improved.

Figure 7:
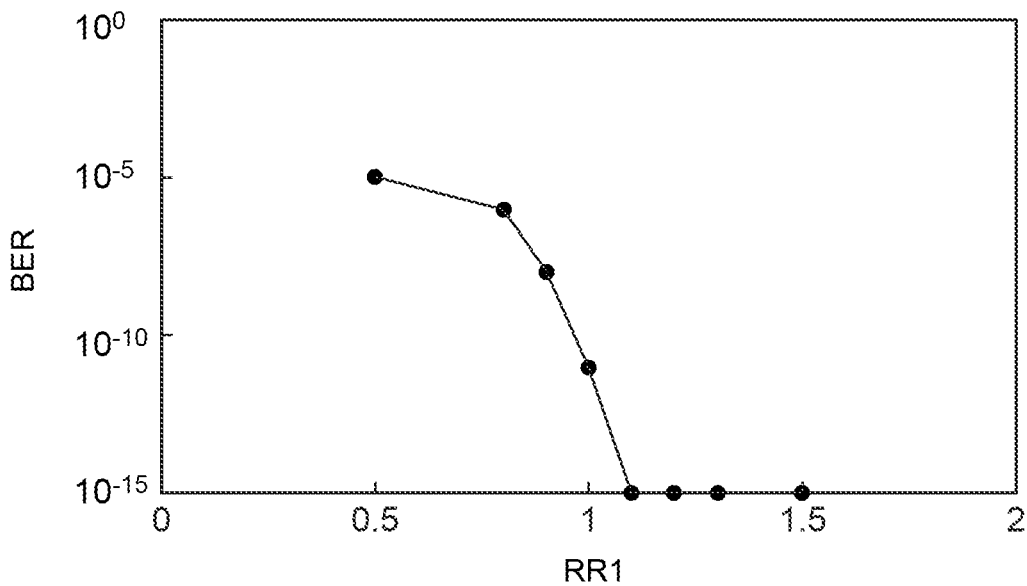
FIG. 7 is a graph illustrating characteristics of the magnetic reproducing and processing device according to the first embodiment.

FIG. 7 is a graph illustrating characteristics of the magnetic reproducing and processing device according to the first embodiment.

The horizontal axis of FIG. 7 is a sensitivity ratio RR1. The sensitivity ratio RR1 is a ratio of the strength of the second pattern signal Se2 to the strength of the first pattern signal Se1 (see FIGS. 2A and 2B). The first pattern signal Set is a signal corresponding to the 1T pattern strength in the first electric signal Sr1 of the first reproducing element 11E. The second pattern signal Se2 is a signal corresponding to the 1T pattern strength in the second electric signal Sr2 of the second reproducing element 12E. The vertical axis of FIG. 7 is a BER (bit error rate).

As shown in FIG. 7, when the sensitivity ratio RR1 is low, the BER is high. When the sensitivity ratio RR1 exceeds 1, a low BER is obtained. When the sensitivity ratio RR1 is not less than 1.1, an extremely low BER can be obtained.

In the embodiment, the sensitivity ratio RR1 is preferably not less than 1.1. For example, the strength of the second pattern signal Se2 is preferably not less than 1.1 times the strength of the first pattern signal Se1. This gives a very low BER. Higher precision reproduction is possible.

Second Embodiment

The second embodiment relates to a magnetic recording and reproducing device 210 (see, for example, FIG. 1). The magnetic recording and reproducing device 210 includes the magnetic reproducing and processing device 70 according to the embodiment and the magnetic head 110. The magnetic head 110 includes the reproducing part 10R (first reproducing element 11E and second reproducing element 12E). Hereinafter, an example of the configuration of multiple reproducing elements will be described. For example, a difference in sensitivity can be formed due to a difference in the configuration.

Figure 8:
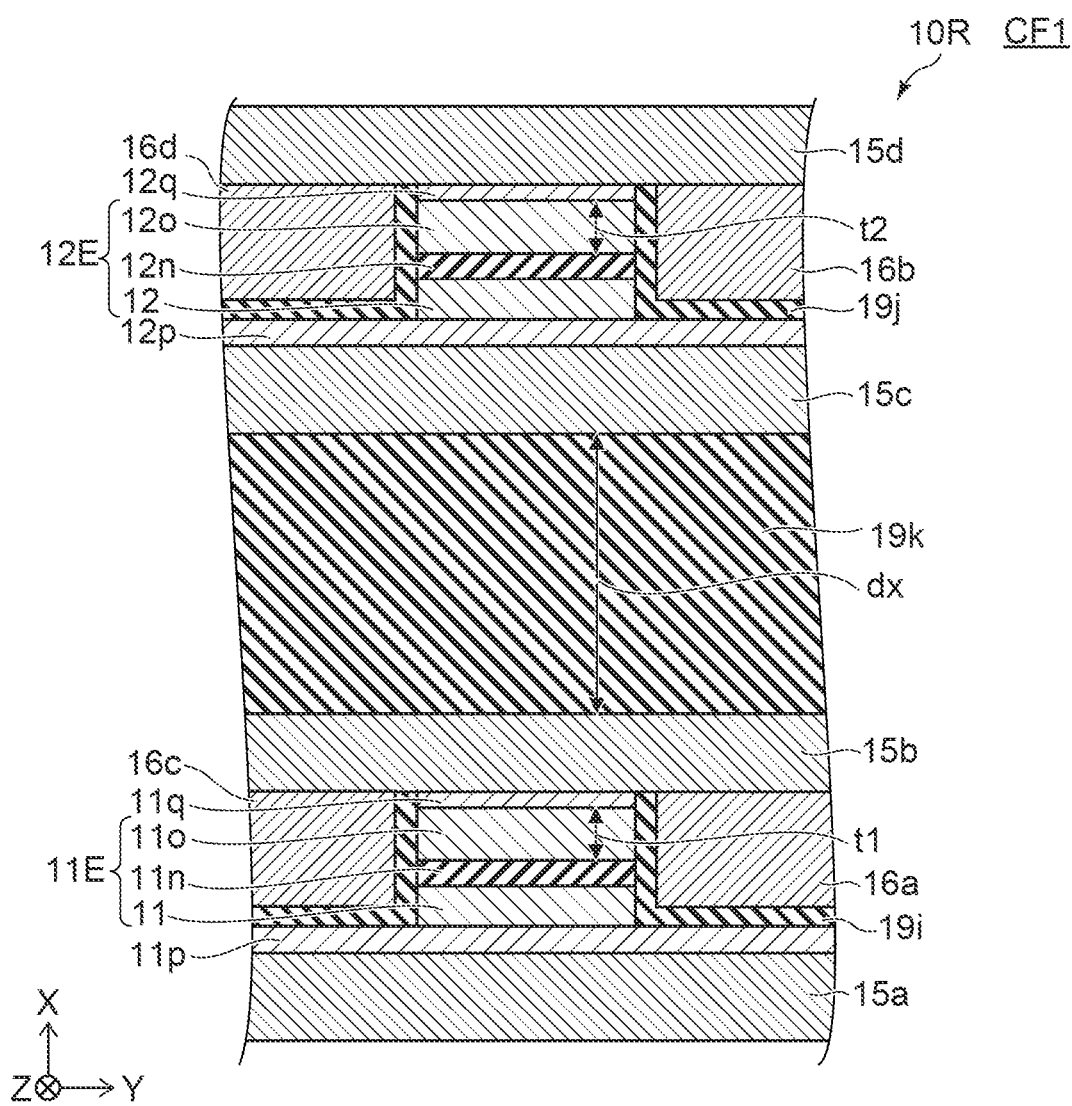
FIG. 8 is a schematic cross-sectional view illustrating a part of a magnetic recording and reproducing device according to a second embodiment.
Figure 9:
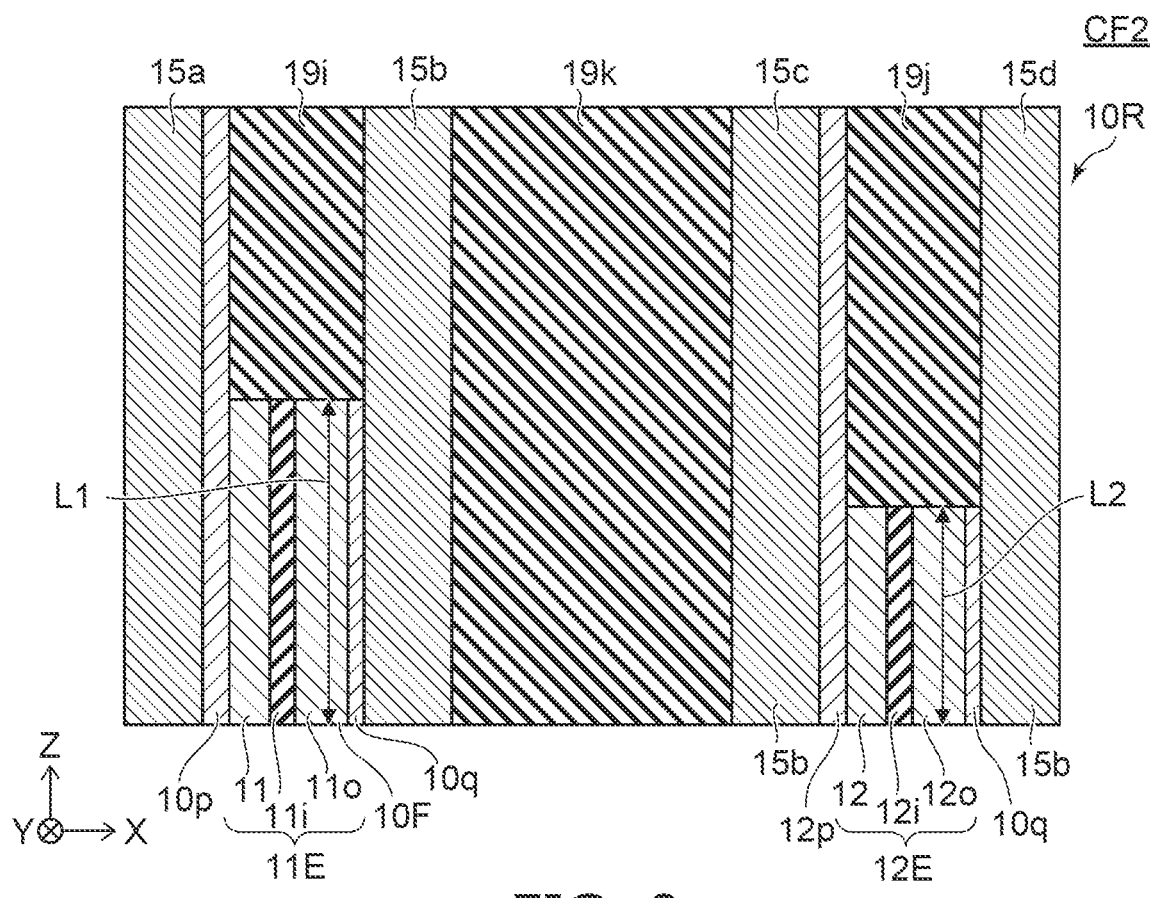
FIG. 9 is a schematic cross-sectional view illustrating a part of the magnetic recording and reproducing device according to the second embodiment.
Figure 10:
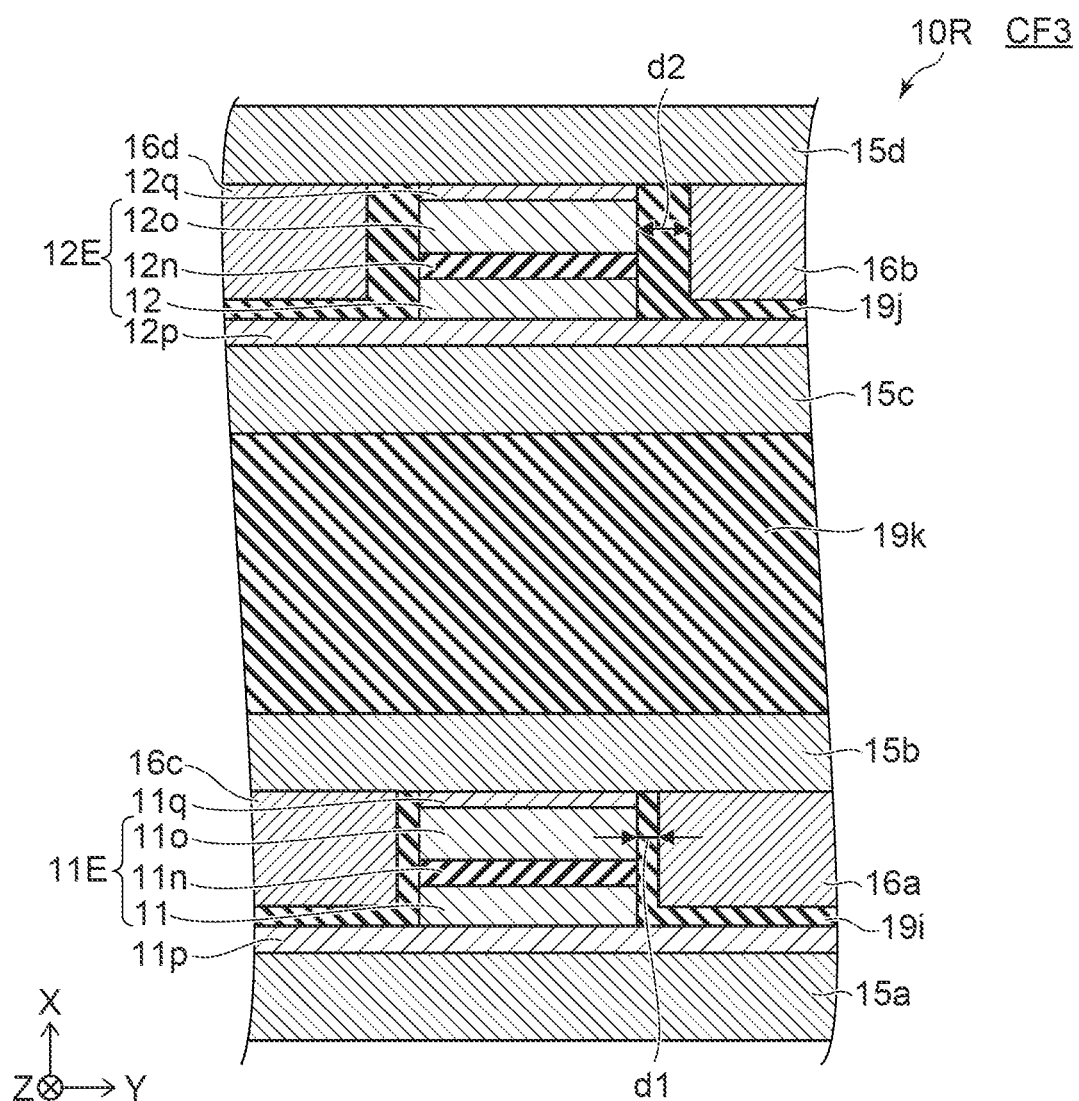
FIG. 10 is a schematic cross-sectional view illustrating a part of the magnetic recording and reproducing device according to the second embodiment.

FIGS. 8 to 10 are schematic cross-sectional views illustrating a part of a magnetic recording and reproducing device according to a second embodiment.

FIGS. 8 to 10 illustrate the first to third reproducing part configurations CF1 to CF3 relating to the reproducing part 10R. As described above, the first reproducing element 11E includes a medium-facing surface 10F facing the magnetic recording medium 80 (see FIG. 1). The first direction from the first reproducing element 11E to the second reproducing element 12E is along the down track direction (for example, X-axis direction) of the magnetic recording medium 80.

As shown in FIG. 8, in the first reproducing part configuration CF1, the first reproducing element 11E includes a first magnetic layer 11, a first counter magnetic layer 11o, and a first non-magnetic layer 11n. The first non-magnetic layer 11n is provided between the first magnetic layer 11 and the first counter magnetic layer 11o in the first direction.

The second reproducing element 12E includes a second magnetic layer 12, a second counter magnetic layer 12o, and a second non-magnetic layer 12n. The second non-magnetic layer 12n is provided between the second magnetic layer 12 and the second counter magnetic layer 12o in the first direction.

In this example, the first reproducing element 11E is between the first reproducing shield 15a and the second reproducing shield 15b. The second reproducing element 12E is between the third reproducing shield 15c and the fourth reproducing shield 15d. A direction from the first reproducing shield 15a to the second reproducing shield 15b is along the first direction (for example, the X-axis direction).

In this example, the magnetic portion 11p is provided between the first reproducing shield 15a and the first magnetic layer 11. A non-magnetic portion 11q is provided between the first counter magnetic layer 11o and the second reproducing shield 15b. In this example, a magnetic portion 12p is provided between the third reproducing shield 15c and the second magnetic layer 12. A non-magnetic portion 12q is provided between the second counter magnetic layer 12o and the fourth reproducing shield 15d. The magnetic portion 11p and the magnetic portion 12p include, for example, at least one selected from the group consisting of IrMn and PtMn. The magnetic portion 11p and the magnetic portion 12p are, for example, antiferromagnetic layers. For example, the magnetic portion 11p stabilizes the magnetization of the first magnetic layer 11. For example, the magnetic portion 12p stabilizes the magnetization of the second magnetic layer 12.

The non-magnetic part 11q and the non-magnetic part 12q include, for example, at least one selected from the group consisting of Ta, Ru, Cu and C. By providing the non-magnetic portion 11q, for example, the magnetization of the first counter magnetic layer 11o is likely to change. By providing the non-magnetic portion 12q, for example, the magnetization of the second counter magnetic layer 12o is likely to change. The non-magnetic portion 11q may be included in the first reproducing element 11E. The non-magnetic portion 12q may be included in the second reproducing element 12E.

For example, the first counter magnetic layer 11o and the second counter magnetic layer 12o are magnetization free layers. The first magnetic layer 11 and the second magnetic layer 12 are reference layers.

An electrical resistance between the first magnetic layer 11 and the first counter magnetic layer 11o changes according to the magnetization 83 of the magnetic recording medium 80. This is because, for example, the magnetization of the first counter magnetic layer 11o changes according to the magnetization 83 of the magnetic recording medium 80.

An electrical resistance between the second magnetic layer 12 and the second counter magnetic layer 12o changes according to the magnetization 83 of the magnetic recording medium 80. This is because, for example, the magnetization of the second counter magnetic layer 12o changes according to the magnetization 83 of the magnetic recording medium 80.

As shown in FIG. 8, a thickness of the first counter magnetic layer 11o along the first direction is defined as a first thickness t1. A thickness of the second counter magnetic layer 12o along the first direction is defined as a second thickness t2. In the first reproducing part configuration CF1, the first thickness t1 is different from the second thickness t2. For example, the first thickness t1 is thicker than the second thickness t2. Due to such a difference in thickness, a difference in sensitivity can be obtained between the first reproducing element 11E and the second reproducing element 12E.

In the embodiment, the first thickness t1 is not less than 1.2 times and not more than 3.0 times the second thickness t2. The first thickness t1 is, for example, not less than 5 nm and not more than 15 nm. The second thickness t2 is, for example, not less than 2 nm and not more than 10 nm.

As shown in FIG. 8, a distance along the first direction (X-axis direction) between the first reproducing element 11E and the second reproducing element 12E is defined as a distance dx. The distance dx is preferably, for example, not less than 50 μm and not more than 200 μm. It is easy to obtain a stable reproduced signal. The distance dx is preferably short.

The reproducing part 10R may include an insulating member 19k. At least a part of the insulating member 19k is between the first reproducing element 11E and the second reproducing element 12E. In this example, at least a part of the insulating member 19k is between the second reproducing shield 15b and the third reproducing shield 15c.

As shown in FIG. 8, the reproducing part 10R may include a first magnetic member 16a and the first counter magnetic member 16c. In the Y-axis direction, there is a first reproducing element 11E between the first magnetic member 16a and the first counter magnetic member 16c. The reproducing part 10R may include a second magnetic member 16b and a second counter magnetic member 16d. In the Y-axis direction, there is a second reproducing element 12E between the second magnetic member 16b and the second counter magnetic member 16d. The first magnetic member 16a, the first counter magnetic member 16c, the second magnetic member 16b, and the second counter magnetic member 16d function as, for example, a bias magnetic layer. By providing these magnetic members, the magnetization of the magnetic layer included in the first reproducing element 11E and the second reproducing element 12E is stabilized.

The reproducing part 10R may include an insulating member 19i and an insulating member 19j. At least a part of the insulating member 19i is provided between the first reproducing element 11E and the first magnetic member 16a, and between the first reproducing element 11E and the first counter magnetic member 16c. At least a part of the insulating member 19j is provided between the second reproducing element 12E and the second magnetic member 16b, and between the second reproducing element 12E and the second counter magnetic member 16d.

At least one of the insulating member 19k, the insulating member 19i, or the insulating member 19j may include, for example, at least one selected from the group consisting of Si, Al, Zr, and Hf, and at least one selected from the group consisting of oxygen and nitrogen.

As shown in FIG. 9, in the second reproducing part configuration CF2, a length of the first counter magnetic layer 11o along the second direction is defined as a first length L1. The second direction crosses the medium-facing surface 10F. The second direction is, for example, the Z-axis direction. A length of the second counter magnetic layer 12o along the second direction is defined as a second length L2. For example, the first length L1 is longer than the second length L2. Due to such a difference in length, a difference in sensitivity can be obtained between the first reproducing element 11E and the second reproducing element 12E.

In the embodiment, the first length L1 is not less than 1.1 times and not more than 2.0 times the second length L2. The first length L1 is, for example, not less than 20 nm and not more than 40 nm. The second length L2 is, for example, not less than 15 nm and not more than 30 nm.

As shown in FIG. 10, in the third reproducing part configuration CF3, the reproducing part 10R also includes the first magnetic member 16a and the second magnetic member 16b. The reproducing part 10R may include the first counter magnetic member 16c and the second counter magnetic member 16d. The first reproducing element 11E includes a medium-facing surface 10F. Also in this case, the first direction from the first reproducing element 11E to the second reproducing element 12E is along the X-axis direction (down track direction of the magnetic recording medium 80).

A direction from the first counter magnetic layer 11o to the first magnetic member 16a is along the third direction. The third direction is along the medium-facing surface 10F (direction along the X-Y plane) and crosses the first direction (X-axis direction). The third direction is, for example, the Y-axis direction. A direction from the second counter magnetic layer 12o to the second magnetic member 16b is along the third direction.

A distance along the third direction between the first counter magnetic layer 11o and the first magnetic member 16a is defined as a first distance d1. A distance between the second counter magnetic layer 12o and the second magnetic member 16b along the third direction is defined as a second distance d2. The first distance d1 is different from the second distance d2. For example, the first distance d1 is shorter than the second distance d2. Due to such a difference in distance, a difference in sensitivity can be obtained between the first reproducing element 11E and the second reproducing element 12E. The configuration of the first counter magnetic member 16c may be symmetrical with respect to the configuration of the first magnetic member 16a, for example. The configuration of the second counter magnetic member 16d may be symmetrical with respect to the configuration of the second magnetic member 16b, for example.

In the embodiment, two or more of the first to third reproducing part configurations CF1 to CF3 may be provided in combination.

At least one of the first magnetic layer 11 or the second magnetic layer 12 includes at least one selected from the group consisting of Fe, Co, and Ni. At least one of the first counter magnetic layer 11o or the second counter magnetic layer 12o includes at least one selected from the group consisting of Fe, Co and Ni. At least one of the first non-magnetic layer 11n or the second non-magnetic layer 12n incudes a metal oxide (for example, MgO). At least one of the first magnetic member 16a, the first counter magnetic member 16c, the second magnetic member 16b, or the second counter magnetic member 16d includes at least one selected from the group consisting of Fe, Co, and Ni.

Third Embodiment

The third embodiment relates to a magnetic reproducing method. The magnetic reproducing method includes acquiring a first electric signal Sr1 obtained by reproducing the information 80i recorded in the first recording area 80r of the magnetic recording medium 80 by the first reproducing element 11E and the second electric signal Sr2 obtained by reproducing the information 80i recorded in the first magnetic recording area 80r by the second reproducing element 12E (for example, step S11 and step S12). As described with respect to FIGS. 2A and 2B, the first sensitivity of the first reproducing element 11E to the magnetic signal (magnetic signal strength SM) recorded on the magnetic recording medium 80 is different from the second sensitivity of the second reproducing element 12E with respect to the magnetic signal (the magnetic signal strength SM).

The magnetic reproducing method includes outputting the reproduced signal 70s corresponding to the information 80i recorded in the first recording area 80r based on the acquired first electric signal Sr1 and the second electric signal Sr2 (for example, step S35).

According to the magnetic reproduction method according to the embodiment, for example, errors can be further suppressed. Higher precision reproducing is possible. Magnetic recording and reproducing with a higher line recording density is possible. According to the embodiment, a magnetic reproducing and processing method can be provided, in which the recording and reproduction density is possible to be improved.

In the embodiment, for example, reproducing is performed using multiple reproducing elements having different output characteristics. For example, it is not necessary to perform all decoding in at least one of the multiple reproducing elements. Information about the likelihood of the multiple reproducing elements is utilized. As a result, decoding is performed by the multiple reproducing elements.

Generally, in a reproducing element, linearity including a long periodic magnetic pattern (nT pattern) is applied. For example, the output characteristics of the reproducing element are designed so that linear characteristics can be obtained between the 1T pattern and the 12T pattern.

In the embodiment, the output characteristics of one of the multiple reproducing elements are designed so that high sensitivity can be obtained in a short periodic pattern close to the 1T pattern. Practically, the frequency of occurrence of the short periodic pattern close to the 1T pattern is greater than the frequency of occurrence of a long periodic magnetic pattern. On the other hand, the probability of occurrence of a reproduction error occurring in the short periodic pattern close to the 1T pattern is greater than that of a reproduction error occurring in the long periodic magnetic pattern.

In the embodiment, the sensitivity of one of the multiple reproducing elements is set to be high in the short period pattern in which the frequency of occurrence is high and the probability of reproduction error is high. As a result, it is possible to suppress a reproduction error in the entire reproducing operation.

An example of a magnetic recording and reproducing device will be described below.

Figure 11:
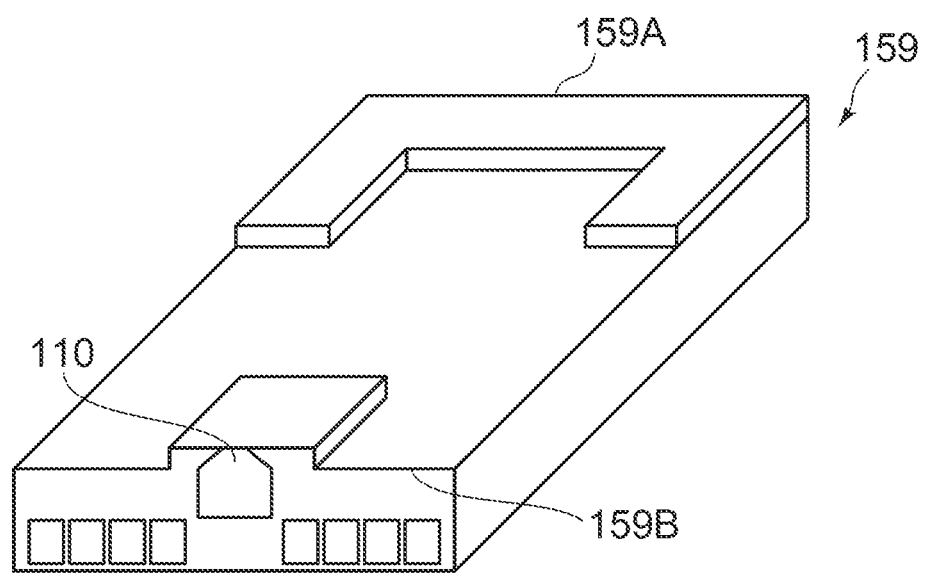
FIG. 11 is a schematic perspective view illustrating a part of the magnetic recording and reproducing device according to the embodiment.

FIG. 11 is a schematic perspective view illustrating a part of the magnetic recording and reproducing device according to the embodiment.

FIG. 11 illustrates a head slider.

The magnetic head 110 is provided on the head slider 159. The head slider 159 includes, for example, Al$_2$O$_3$/TiC and the like. The head slider 159 moves relative to the magnetic recording medium while floating or contacting the magnetic recording medium.

The head slider 159 has, for example, an air inflow side 159A and an air outflow side 159B. The magnetic head 110 is arranged on a side surface of the air outflow side 159B of the head slider 159. As a result, the magnetic head 110 moves relative to the magnetic recording medium while floating or contacting the magnetic recording medium.

Figure 12:
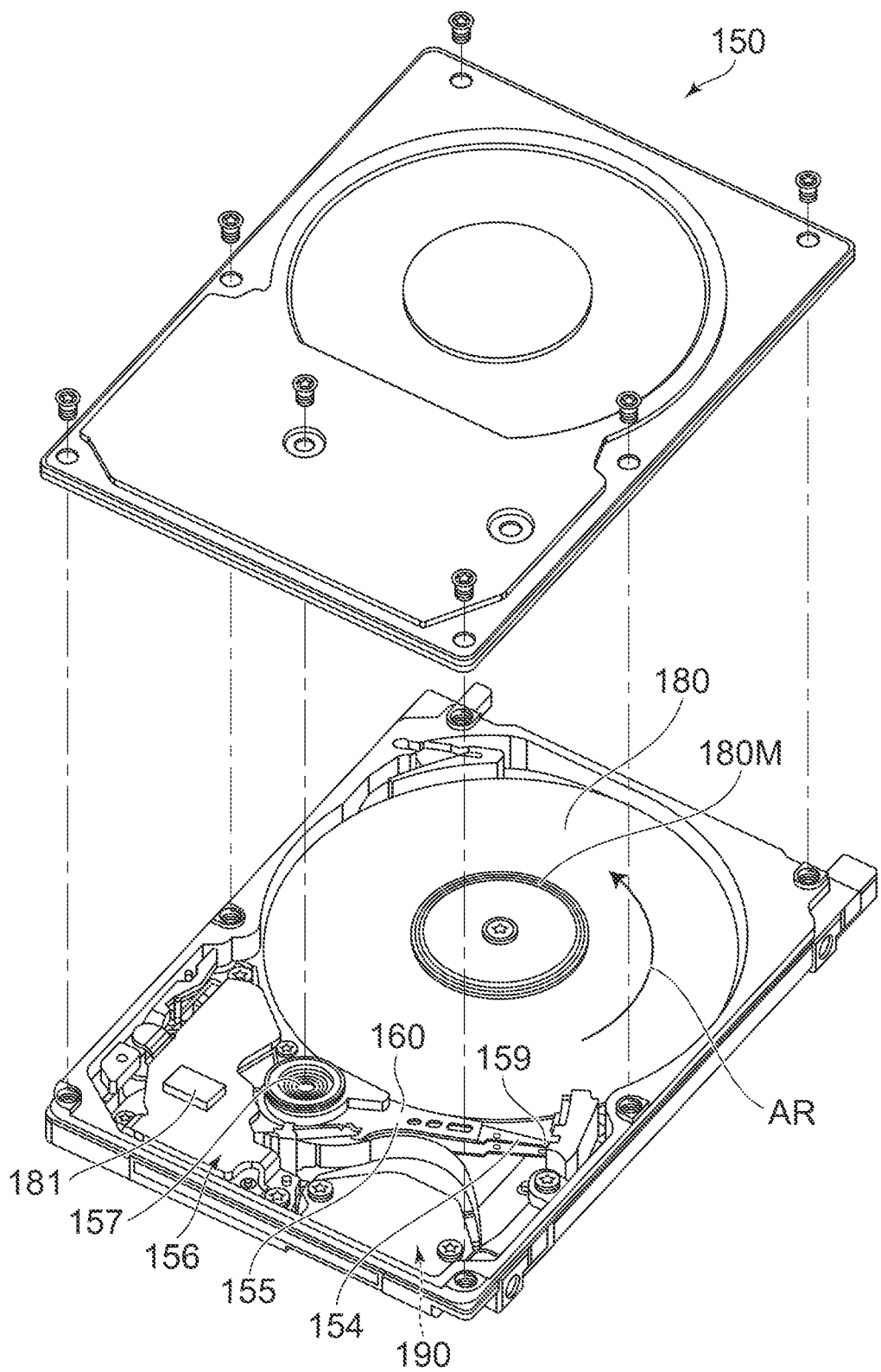
FIG. 12 is a schematic perspective view illustrating the magnetic recording and reproducing device according to the embodiment.

FIG. 12 is a schematic perspective view illustrating the magnetic recording and reproducing device according to the embodiment.

As shown in FIG. 12, in the magnetic recording and reproducing device 150 according to the embodiment, a rotary actuator is used. The recording medium disk 180 is mounted on a spindle motor 180M. The recording medium disk 180 is rotated in the direction of the arrow AR by the spindle motor 180M. The spindle motor 180M responds to a control signal from the drive device controller. The magnetic recording and reproducing device 150 according to the embodiment may include multiple recording medium disks 180. The magnetic recording and reproducing device 150 may include a recording medium 181. The recording medium 181 is, for example, an SSD (Solid State Drive). As the recording medium 181, for example, a non-volatile memory such as a flash memory is used. For example, the magnetic recording and reproducing device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the downward pressure due to the suspension 154 and the pressure generated on the medium-facing surface (ABS) of the head slider 159 are balanced. The distance between the medium-facing surface of the head slider 159 and the surface of the recording medium disk 180 is a predetermined fly height. In the embodiment, the head slider 159 may be in contact with the recording medium disk 180. For example, a contact-sliding type may be applied.

The suspension 154 is connected to one end of the arm 155 (for example, an actuator arm). The arm 155 has, for example, a bobbin part and the like. The bobbin part holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin part of the arm 155. The magnetic circuit includes a permanent magnet and an opposed yoke. The drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 13A:
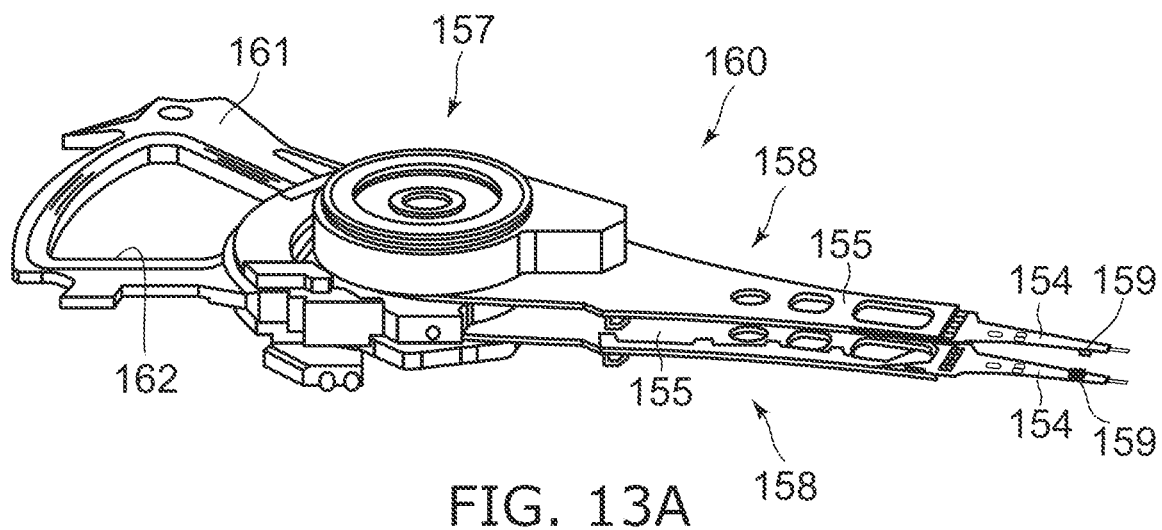
FIGS. 13A and 13B are schematic perspective views illustrating a part of the magnetic recording and reproducing device according to the embodiment.
Figure 13B:
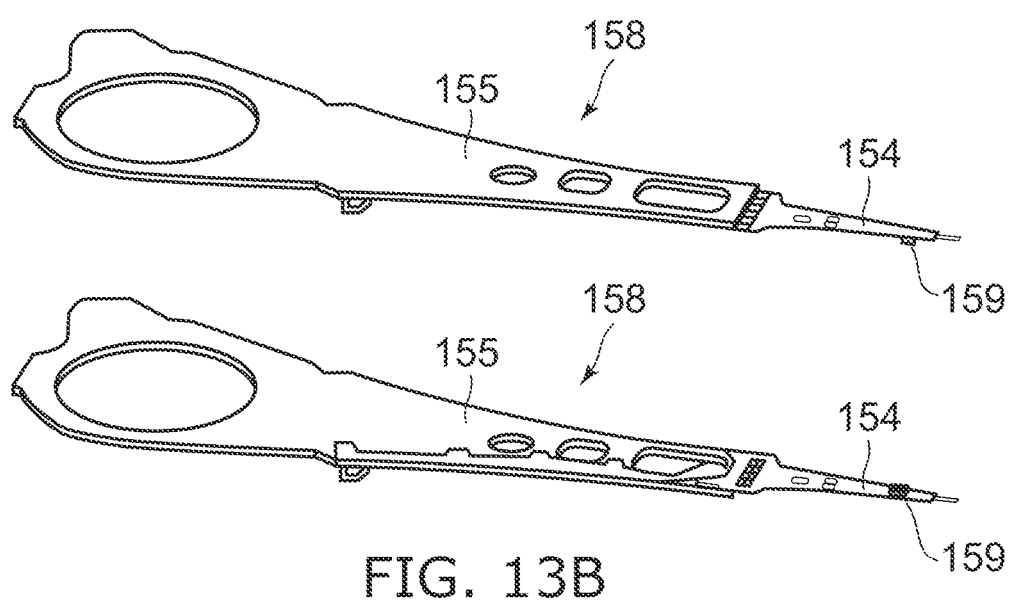

FIGS. 13A and 13B are schematic perspective views illustrating a part of the magnetic recording and reproducing device according to the embodiment.

FIG. 13A illustrates a part of the magnetic recording and reproducing device. FIG. 13A is an enlarged perspective view of the head stack assembly 160.

FIG. 13B illustrates a magnetic head assembly (head gimbal assembly: HGA) 158 that is a part of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 13B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, a lead wire (not shown) for recording and reproducing a signal. The suspension 154 may include, for example, a lead wire (not shown) for a heater for adjusting the fly height. The suspension 154 may include a lead wire (not shown) for, for example, a spin transfer torque oscillator. These lead wires and multiple electrodes provided on the magnetic head are electrically connected.

The signal processor 190 is provided in the magnetic recording and reproducing device 150. The signal processor 190 records and reproduces the signal on the magnetic recording medium using the magnetic head. In the signal processor 190, the input/output lines of the signal processor 190 are connected to, for example, the electrode pads of the head gimbal assembly 158, and electrically connected to the magnetic head.

The magnetic recording and reproducing device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces the signal on the magnetic recording medium using the magnetic head.

For example, the recording medium disk 180 is used as the above magnetic recording medium. The movable part includes, for example, the head slider 159. The position controller includes, for example, the head gimbal assembly 158.

The embodiment may include the following configuration (for example, a technical proposal).

Configuration 1

A magnetic reproducing and processing device, comprising:

an acquirer configured to acquire a first electric signal obtained by reproducing information recorded in a first recording area of a magnetic recording medium by a first reproducing element and a second electric signal obtained by reproducing the information recorded in the first recording area by a second reproducing element, a first sensitivity of the first reproducing element to a magnetic signal recorded on the magnetic recording medium being different from a second sensitivity of the second reproducing element to the magnetic signal; and a processor configured to output a reproduced signal corresponding to the information recorded in the first recording area based on the first electric signal and the second electric signal acquired by the acquirer.

Configuration 2

The magnetic reproducing and processing device according to Configuration 1, wherein a magnetic signal strength in the first recording area includes a 1T pattern strength corresponding to a minimum recording pattern, the first electric signal includes a first pattern signal corresponding to the 1T pattern strength, the second electric signal includes a second pattern signal corresponding to the 1T pattern strength, and a strength of the second pattern signal is greater than a strength of the first pattern signal.

Configuration 3

The magnetic reproducing and processing device according to Configuration 2, wherein the strength of the second pattern signal is not less than 1.1 times the strength of the first pattern signal.

Configuration 4

The magnetic reproducing and processing device according to Configuration 1 or 2, wherein the magnetic signal strength includes an nT pattern strength corresponding to n times (n is an integer not less than 3) the minimum recording pattern, the first electric signal includes a third pattern signal corresponding to the nT pattern strength, the second electric signal includes a fourth pattern signal corresponding to the nT pattern strength, and an absolute value of a difference between the strength of the first pattern signal and the strength of the second pattern signal is greater than an absolute value of a difference between a strength of the third pattern signal and a strength of the fourth pattern signal.

Configuration 5

The magnetic reproducing and processing device according to Configuration 4, wherein between the first pattern signal and the third pattern signal, a strength of the first electrical signal changes substantially linearly with respect to the magnetic signal strength.

Configuration 6

The magnetic reproducing and processing device according to Configuration 4 or 5, wherein the magnetic signal strength includes an mT pattern strength corresponding to m times (m is n−1) of the minimum recording pattern, the second electric signal includes a fifth pattern signal corresponding to the mT pattern strength, and an absolute value of a difference between a strength of the fifth pattern signal and the strength of the fourth pattern signal is less than 1/m of an absolute value of a difference between the strength of the second pattern signal and the strength of the fourth pattern signal.

Configuration 7

The magnetic reproducing and processing device according to any one of Configurations 1 to 6, wherein the processor includes a first waveform equalizer waveform-processing the first electric signal acquired by the acquirer, a second waveform equalizer waveform-processing the second electric signal acquired by the acquirer, a first signal processor processing a signal from the first waveform equalizer, a second signal processor processing a signal from the second waveform equalizer, and a processing circuit configured to derive the reproduced signal based on a first output signal of the first signal processor and a second output signal of the second signal processor.

Configuration 8

The magnetic reproducing and processing device according to Configuration 7, wherein the first output signal includes a first likelihood with respect to the signal from the first waveform equalizer, and the second output signal includes a second likelihood with respect to the signal from the second waveform equalizer.

Configuration 9

The magnetic reproducing and processing device according to Configuration 7 or 8, wherein the processing circuit includes a neural network processor that the first output signal and the second output signal are input.

Configuration 10

The magnetic reproducing and processing device according to any one of Configurations 7 to 9, wherein at least a part of a processing result of the processing circuit is input to the first signal processor and the second signal processor, and an operation of the first signal processor, an operation of the second signal processor, and an operation of the processing circuit are repeatedly performed.

Configuration 11

The magnetic reproducing and processing device according to any one of Configurations 7 to 10, wherein at least a part of a processing result of the first signal processor is supplied to the second signal processor, and the second signal processor is configured to process the signal of the second waveform equalizer by using the at least a part of the processing result of the first signal processor.

Configuration 12

The magnetic reproducing and processing device according to any one of Configurations 7 to 11, wherein at least a part of a processing result of the second signal processor is supplied to the first signal processor, and the first signal processor is configured to process the signal of the first waveform equalizer by using the at least a part of the processing result of the second signal processor.

Configuration 13

The magnetic reproducing and processing device according to any one of Configurations 7 to 12, wherein at least one of the first waveform equalizer or the second waveform equalizer includes a PR (Partial-Response) circuit.

Configuration 14

The magnetic reproducing and processing device according to any one of Configurations 7 to 13, wherein at least one of the first signal processor or the second signal processor includes a PRML (Partial-Resistance Maximum-Likelihood) circuit.

Configuration 15

The magnetic reproducing and processing device according to any one of Configurations 7 to 14, wherein at least one of the first signal processor or the second signal processor includes a LDPC(Low Density Parity Check) decoder.

Configuration 16

A magnetic recording and reproducing device, comprising:

the magnetic reproducing and processing device according to any one of Configurations 1 to 15;

a magnetic head including a reproducing part including the first reproducing element and the second reproducing element.

Configuration 17

The magnetic recording and reproducing device according to Configuration 16, wherein a first direction from the first reproducing element to the second reproducing element is along a down track direction of the magnetic recording medium, the first reproducing element includes a first magnetic layer, a first counter magnetic layer, and a first non-magnetic layer provided between the first magnetic layer and the first counter magnetic layer in the first direction, the second reproducing element includes a second magnetic layer, a second counter magnetic layer, and a second non-magnetic layer provided between the second magnetic layer and the second counter magnetic layer in the first direction, and a first thickness of the first counter magnetic layer along the first direction is different from a second thickness of the second counter magnetic layer along the first direction.

Configuration 18

The magnetic recording and reproducing device according to Configuration 16, wherein the first reproducing element includes a medium-facing surface facing the magnetic recording medium, a first direction from the first reproducing element to the second reproducing element is along a down-track direction of the magnetic recording medium, the first reproducing element includes a first magnetic layer, a first counter magnetic layer, and a first non-magnetic layer provided between the first magnetic layer and the first counter magnetic layer in the first direction, the second reproducing element includes a second magnetic layer, a second counter magnetic layer, and a second non-magnetic layer provided between the second magnetic layer and the second counter magnetic layer in the first direction, and a first length of the first counter magnetic layer along a second direction is different from a second length of the second counter magnetic layer along the second direction, the second direction crossing the medium-facing surface.

Configuration 19

The magnetic recording and reproducing device according to Configuration 16, wherein the first reproducing element includes a first magnetic member and a second magnetic member, a first direction from the first reproducing element to the second reproducing element is along a down-track direction of the magnetic recording medium, the first reproducing element includes a first magnetic layer, a first counter magnetic layer, and a first non-magnetic layer provided between the first magnetic layer and the first counter magnetic layer in the first direction, the second reproducing element includes a second magnetic layer, a second counter magnetic layer, and a second non-magnetic layer provided between the second magnetic layer and the second counter magnetic layer in the first direction, a direction from the first counter magnetic layer to the first magnetic member is along a third direction, a direction from the second counter magnetic layer to the second magnetic member is along the third direction, the third direction is along the medium-facing surface and crosses the first direction, and a first distance along the third direction between the first counter magnetic layer and the first magnetic member is different from a second distance along the third direction between the second counter magnetic layer and the second magnetic member.

Configuration 20

A magnetic reproducing method, comprising:

acquiring a first electric signal obtained by reproducing information recorded in a first recording area of a magnetic recording medium by a first reproducing element and a second electric signal obtained by reproducing the information recorded in the first recording area by a second reproducing element, a first sensitivity of the first reproducing element to a magnetic signal recorded on the magnetic recording medium being different from a second sensitivity of the second reproducing element to the magnetic signal; and outputting a reproduced signal corresponding to the information recorded in the first recording area based on the acquired first electric signal and the acquired second electric signal.

According to the embodiment, a magnetic reproducing and processing device, a magnetic recording and reproducing device, and a magnetic reproducing method can be provided, in which a recording reproducing density is possible to be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic reproducing and processing devices such as acquirers, processors, and included in magnetic recording and reproducing devices such as magnetic heads, reproducing parts, reproducing elements, magnetic layers, non-magnetic layers, recording parts, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic reproducing and processing devices, magnetic recording and reproducing devices, and magnetic reproducing methods practicable by an appropriate design modification by one skilled in the art based on the magnetic reproducing and processing devices, the magnetic recording and reproducing devices, and the magnetic reproducing methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic reproducing and processing device, comprising:
    an acquirer configured to acquire a first electric signal obtained by reproducing information recorded in a first recording area of a magnetic recording medium by a first reproducing element and a second electric signal obtained by reproducing the information recorded in the first recording area by a second reproducing element, a first sensitivity of the first reproducing element to a magnetic signal recorded on the magnetic recording medium being different from a second sensitivity of the second reproducing element to the magnetic signal; and
    a processor configured to output a reproduced signal corresponding to the information recorded in the first recording area based on the first electric signal and the second electric signal acquired by the acquirer, wherein
    a magnetic signal strength in the first recording area includes a 1T pattern strength corresponding to a minimum recording pattern,
    the first electric signal includes a first pattern signal corresponding to the 1T Pattern strength,
    the second electric signal includes a second pattern signal corresponding to the 1T pattern strength, and
    a strength of the second pattern signal is greater than a strength of the first pattern signal.

2. The device according to claim 1, wherein the strength of the second pattern signal is not less than 1.1 times the strength of the first pattern signal.

3. A magnetic reproducing and processing device, comprising:
    an acquirer configured to acquire a first electric signal obtained by reproducing information recorded in a first recording area of a magnetic recording medium by a first reproducing element and a second electric signal obtained by reproducing the information recorded in the first recording area by a second reproducing element, a first sensitivity of the first reproducing element to a magnetic signal recorded on the magnetic recording medium being different from a second sensitivity of the second reproducing element to the magnetic signal; and
    a processor configured to output a reproduced signal corresponding to the information recorded in the first recording area based on the first electric signal and the second electric signal acquired by the acquirer, wherein
    magnetic signal strength includes an nT pattern strength corresponding to n times (n is an integer not less than 3) the minimum recording pattern,
    the first electric signal includes a third pattern signal corresponding to the nT pattern strength,
    the second electric signal includes a fourth pattern signal corresponding to the nT pattern strength, and
    an absolute value of a difference between the strength of the first pattern signal and the strength of the second pattern signal is greater than an absolute value of a difference between a strength of the third pattern signal and a strength of the fourth pattern signal.

4. The device according to claim 3, wherein
between the first pattern signal and the third pattern signal, a strength of the first electrical signal changes substantially linearly with respect to the magnetic signal strength.

5. The device according to claim 3, wherein
the magnetic signal strength includes an mT pattern strength corresponding to m times (m is n−1) of the minimum recording pattern,
the second electric signal includes a fifth pattern signal corresponding to the mT pattern strength, and
an absolute value of a difference between a strength of the fifth pattern signal and the strength of the fourth pattern signal is less than 1/m of an absolute value of a difference between the strength of the second pattern signal and the strength of the fourth pattern signal.

6. A magnetic reproducing and processing device, comprising:
    an acquirer configured to acquire a first electric signal obtained by reproducing information recorded in a first recording area of a magnetic recording medium by a first reproducing element and a second electric signal obtained by reproducing the information recorded in the first recording area by a second reproducing element, a first sensitivity of the first reproducing element to a magnetic signal recorded on the magnetic recording medium being different from a second sensitivity of the second reproducing element to the magnetic signal; and
    a processor configured to output a reproduced signal corresponding to the information recorded in the first recording area based on the first electric signal and the second electric signal acquired by the acquirer,
wherein the processor includes
    a first waveform equalizer waveform-processing the first electric signal acquired by the acquirer,
    a second waveform equalizer waveform-processing the second electric signal acquired by the acquirer,
    a first signal processor processing a signal from the first waveform equalizer,
    a second signal processor processing a signal from the second waveform equalizer, and
    a processing circuit configured to derive the reproduced signal based on a first output signal of the first signal processor and a second output signal of the second signal processor.

7. The device according to claim 6, wherein
the first output signal includes a first likelihood with respect to the signal from the first waveform equalizer, and
the second output signal includes a first likelihood with respect to the signal from the second waveform equalizer.

8. The device according to claim 6, wherein
the processing circuit includes a neural network processor that the first output signal and the second output signal are input.

9. The device according to claim 6, wherein
at least a part of a processing result of the processing circuit is input to the first signal processor and the second signal processor, and
an operation of the first signal processor, an operation of the second signal processor, and an operation of the processing circuit are repeatedly performed.

10. The device according to claim 6, wherein
at least a part of a processing result of the first signal processor is supplied to the second signal processor, and
the second signal processor is configured to process the signal of the second waveform equalizer by using the at least a part of the processing result of the first signal processor.

11. The device according to claim 6, wherein
at least a part of a processing result of the second signal processor is supplied to the first signal processor, and
the first signal processor is configured to process the signal of the first waveform equalizer by using the at least a part of the processing result of the second signal processor.

12. The device according to claim 6, wherein
at least one of the first waveform equalizer or the second waveform equalizer includes a PR (Partial-Response) circuit.

13. The device according to claim 6, wherein
at least one of the first signal processor or the second signal processor includes a PRML (Partial-Resistance Maximum-Likelihood) circuit.

14. The device according to claim 6, wherein
at least one of the first signal processor or the second signal processor includes a LDPC(Low Density Parity Check) decoder.

15. A magnetic recording and reproducing device, comprising:
the magnetic reproducing and processing device according to claim 1;
a magnetic head including a reproducing part including the first reproducing element and the second reproducing element.

16. The device according to claim 15, wherein
a first direction from the first reproducing element to the second reproducing element is along a down track direction of the magnetic recording medium,
the first reproducing element includes a first magnetic layer, a first counter magnetic layer, and a first non-magnetic layer provided between the first magnetic layer and the first counter magnetic layer in the first direction,
the second reproducing element includes a second magnetic layer, a second counter magnetic layer, and a second non-magnetic layer provided between the second magnetic layer and the second counter magnetic layer in the first direction, and
a first thickness of the first counter magnetic layer along the first direction is different from a second thickness of the second counter magnetic layer along the first direction.

17. The device according to claim 15, wherein
the first reproducing element includes a medium-facing surface facing the magnetic recording medium,
a first direction from the first reproducing element to the second reproducing element is along a down-track direction of the magnetic recording medium,
the first reproducing element includes a first magnetic layer, a first counter magnetic layer, and a first non-magnetic layer provided between the first magnetic layer and the first counter magnetic layer in the first direction,
the second reproducing element includes a second magnetic layer, a second counter magnetic layer, and a second non-magnetic layer provided between the second magnetic layer and the second counter magnetic layer in the first direction, and
a first length of the first counter magnetic layer along a second direction is different from a second length of the second counter magnetic layer along the second direction, the second direction crossing the medium-facing surface.

18. The device according to claim 15, wherein
the first reproducing element includes a first magnetic member and a second magnetic member,
a first direction from the first reproducing element to the second reproducing element is along a down-track direction of the magnetic recording medium,
the first reproducing element includes a first magnetic layer, a first counter magnetic layer, and a first non-magnetic layer provided between the first magnetic layer and the first counter magnetic layer in the first direction,
the second reproducing element includes a second magnetic layer, a second counter magnetic layer, and a second non-magnetic layer provided between the second magnetic layer and the second counter magnetic layer in the first direction,
a direction from the first counter magnetic layer to the first magnetic member is along a third direction,
a direction from the second counter magnetic layer to the second magnetic member is along the third direction,
the third direction is along the medium-facing surface and crosses the first direction, and
a first distance along the third direction between the first counter magnetic layer and the first magnetic member is different from a second distance along the third direction between the second counter magnetic layer and the second magnetic member.

* * * * *